(12) United States Patent  
Handa et al.

(10) Patent No.: US 8,407,494 B2  
(45) Date of Patent: Mar. 26, 2013

(54) POWER SUPPLY CONTROL METHOD AND DEVICE

(75) Inventors: Shigeo Handa, Kawasaki (JP); Yasushi Tateno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 163 days.

(21) Appl. No.: 12/819,049

(22) Filed: Jun. 18, 2010

(65) Prior Publication Data

US 2010/0257387 A1 Oct. 7, 2010

Related U.S. Application Data

(63) Continuation of application No. PCT/JP2007/074444, filed on Dec. 19, 2007.

(51) Int. Cl.
*G06F 1/26* (2006.01)

(52) U.S. Cl. ........................ 713/300; 713/310

(58) Field of Classification Search ............... 713/300, 713/320, 322, 323, 324, 600, 601, 310
See application file for complete search history.

(56) References Cited

U.S. PATENT DOCUMENTS

| | | | |
|---|---|---|---|
| 5,675,479 A | 10/1997 | Tani et al. | |
| 5,732,233 A * | 3/1998 | Klim et al. | 712/200 |
| 6,067,627 A * | 5/2000 | Reents | 713/324 |
| 6,252,384 B1 * | 6/2001 | Arai et al. | 323/282 |
| 2005/0144492 A1 | 6/2005 | Yun et al. | |
| 2006/0294405 A1 * | 12/2006 | Wasa et al. | 713/300 |
| 2007/0300056 A1 * | 12/2007 | Imamiya | 713/2 |

FOREIGN PATENT DOCUMENTS

| | | |
|---|---|---|
| JP | 9-47023 | 2/1997 |
| JP | 2003-241866 | 8/2003 |
| JP | 2005-190483 | 7/2005 |
| JP | 2005-252635 | 9/2005 |
| JP | 2006-157662 | 6/2006 |
| JP | 2006-189996 | 7/2006 |
| JP | 2006-344162 | 12/2006 |

OTHER PUBLICATIONS

Kimihiro Yamakoshi et al., "A large throughput Switch Architecture for IP packet using WDM link", IEICE Technical Report, vol. 100, No. 495, Dec. 2000, pp. 13-18.
International Search Report for Application No. PCT/JP2007/074444; mailed Jan. 29, 2008.
Japanese Office Action mailed Aug. 7, 2012 issued in corresponding Japanese Patent Application No. 2009-546118.
Japanese Office Action mailed May 8, 2012 issued in corresponding Japanese Patent Application No. 2009-546118.

* cited by examiner

*Primary Examiner* — Paul Yanchus, III
(74) *Attorney, Agent, or Firm* — Staas & Halsey LLP

(57) ABSTRACT

When a reception of a data signal is detected, a power supply control start signal is generated and the data signal is outputted to a signal processor in a fixed time. A power supply control signal for suppressing an output voltage variation of a power supply of the signal processor is generated until a processing completion signal from the signal processor is received after the power supply control start signal is generated. Alternatively, data signals received are separated by type and outputted to respective signal processors. After validity setting signals by type are received, a power supply control start signal is generated when the validity setting signals become valid in an overlapped manner. Such a power supply control signal is generated until one of the validity setting signals which have been valid so far becomes invalid after the power supply control start signal is generated.

12 Claims, 13 Drawing Sheets

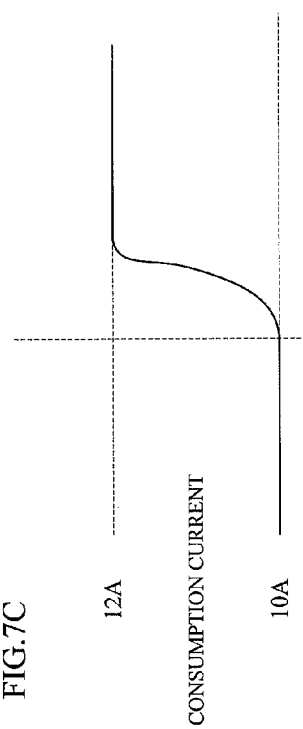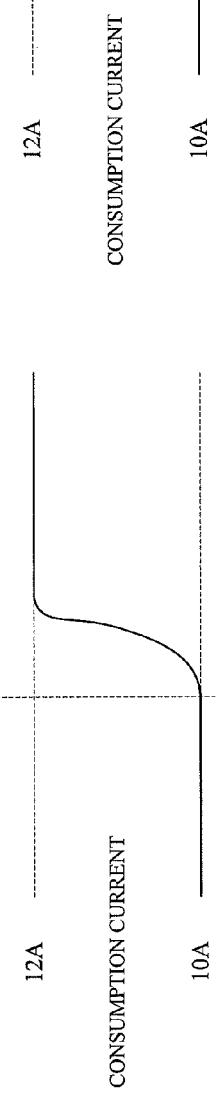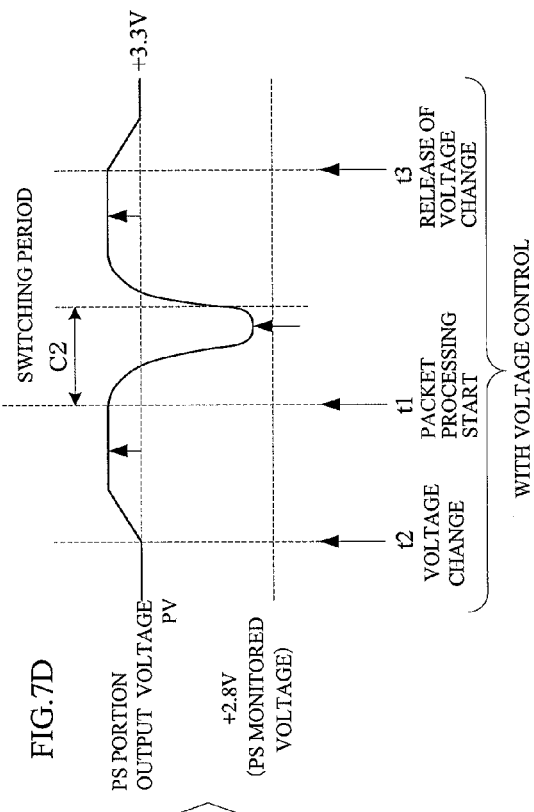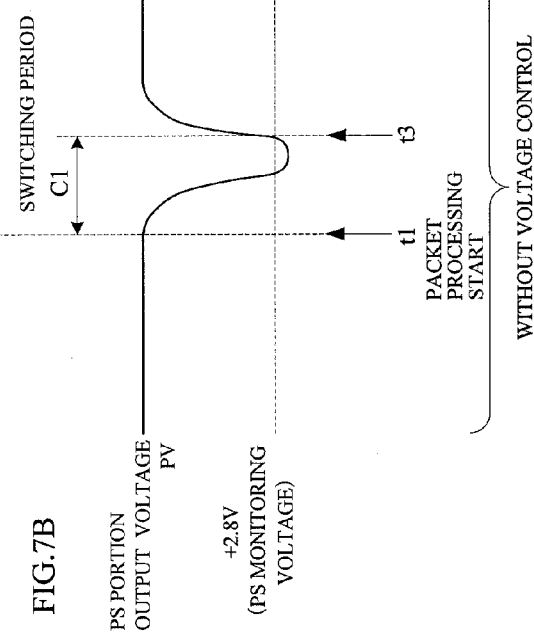
FIG.7A
FIG.7B
FIG.7C
FIG.7D

POWER SUPPLY CONTROL METHOD AND DEVICE

CROSS-REFERENCE TO RELATED APPLICATION

This application is a continuation of International Application PCT/JP2007/74444 filed on Dec. 19, 2007, the contents of which are herein wholly incorporated by reference.

FIELD

The present invention relates to a power supply method and device for a signal processor.

BACKGROUND

In an IT (Information Technology) device such as an optical transmission device, a server system, a high performance personal computer or the like, function enhancement and/or performance enhancement (capacity enhancement, speed enhancement) have been promoted with a rapid spread of a recent Internet/intranet technology or the like. Accordingly, in a hardware forming the corresponding device or system, particularly a circuit unit (device) such as an FPGA (Field Programmable Gate Array), L2/L3 (Layer 2/Layer 3) switch, a CPU, a DSP or the like, voltage degradation and/or current enhancement have been rapidly promoted. Also, for a type of communications data, communication with data such as 1 GbE, 10 GbE or the like that are a large amount of packet data are becoming a mainstream.

Based on this, a power supply or source (PS) portion or unit driving such a hardware is also required to achieve a performance enhancement such as a high efficiency, high precision and high speed response.

FIG. 12 depicts one example of an optical transmission device, in which an optical transmission device 100_1 has a transmitting function where optical signals from external devices 200_1-200_n are converted into electric signals to be subjected to SONET signal processing or packet signal processing at optical interface boards 101_1-101_n and forwarded to a switch board 102 for switching, and the electric signals out of the switch board 102 are subjected to SONET/packet signal processing, converted into optical signals at an optical interface board 101_m and transmitted to an opposing optical transmission device 100_2; and the optical transmission device 100_1 has a receiving function in the reverse direction to the above transmitting direction. Also from a monitoring/controlling board 104, various settings and changes are performed to the optical interface boards 101_1-101_n, 100_m (hereinafter, occasionally represented by a reference numeral 101) and the switch board 102 for the SONET/packet signals etc.

A specific example of the optical interface board 101 depicted in FIG. 12 is further depicted in FIGS. 13A and 13B as an Ethernet unit. This Ethernet unit 101 is composed of an SFP (Small Form factor Pluggable) processing module 21 for converting a GbE optical signal OS into an electric signal, a PHY (Physical) processing module 22 for performing physical layer processing at a latter stage and an FPGA23, where the FPGA23 performs signal processing of the GbE optical signal.

When a normal signal is received, the signal is to be processed in the order of the SFP processing module 21->the PHY processing module 22->a PCS (Physical Coding Sublayer) processing portion 232->a selector 235->a MAC (Media Access Control) processing portion 236 as depicted in FIG. 13A and outputted from a packet buffer 237, whereas in the absence of signal received, no signal processing portion after the MAC processing portion 236 and the followings will operate as depicted in FIG. 13B. Namely, in the absence of signal received, an idle pattern from an idle pattern generator 231 is selected by the selector 235, thereby making the MAC processing portion 236 and the followings perform the circuit processing of the idle pattern.

This enables the idle pattern to be signal processed even in the absence of signals received, thereby holding a state where a current is always consumed to prevent the output voltage of a power supply (not depicted) within the optical interface board 101 from being dropped due to an increase of the consumption power by a rapid signal reception.

It is to be noted that there is a switching power supply in which by providing a ringing choke converter (RCC) type switching power supply circuit with an oscillation frequency suppressing circuit and an operation switchover circuit for starting or stopping the operation of the oscillation frequency suppressing circuit, the operation of the oscillation frequency suppressing circuit 10 is turned on by application of a signal voltage of the operation switchover circuit under light load while the operation of the oscillation frequency suppressing circuit 10 is turned off under a heavy load, thereby performing a normal RCC oscillation (See e.g. Japanese Laid-open Patent Publication No. 9-47023).

In the related art optical interface board (Ethernet unit) depicted in FIGS. 13A and 13B, for preventing the power supply voltage from being dropped due to an increase of the consumption power by a rapid signal reception of a packet etc., an idle pattern signal is provided to the circuit even in the absence of signal received, so that current is always consumed, disadvantageously consuming a useless power.

SUMMARY

According to an aspect of the invention, a power supply control method includes: generating a power supply control start signal when a reception of a data signal is detected and in a fixed time, outputting the data signal to a signal processor; and generating a power supply control signal for suppressing an output voltage variation of a power supply of the signal processor until a reception of a processing completion signal from the signal processor after the power supply control start signal is generated.

According to another aspect of the invention, a power supply control method (or device) includes: separating (or a portion separating) received data signals by type to be outputted to respective signal processors; receiving (or a portion receiving) validity setting signals by type and generating a power supply control start signal when the validity setting signals become valid in an overlapped manner; and generating (or a portion generating) a power supply control signal for suppressing an output voltage variation of each power supply of the signal processors until one of the validity setting signals which have been valid so far becomes invalid after the power supply control start signal is generated.

The above power supply control signal may include a signal for increasing a switching frequency of the power supply or a signal for increasing an output voltage of the power supply.

Also, the above validity setting signals may halt operations of the signal processors made invalid.

Also, the above output signals of the signal processors may be selected based on a combination of the validity setting signals.

Furthermore, the above data signal may include a SONET (Synchronous Optical NETwork) signal or a packet signal.

The object and advantages of the embodiment will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 7 is a waveform diagrams for illustrating an effect of the embodiment [2];

DESCRIPTION OF EMBODIMENTS

Figure 1:
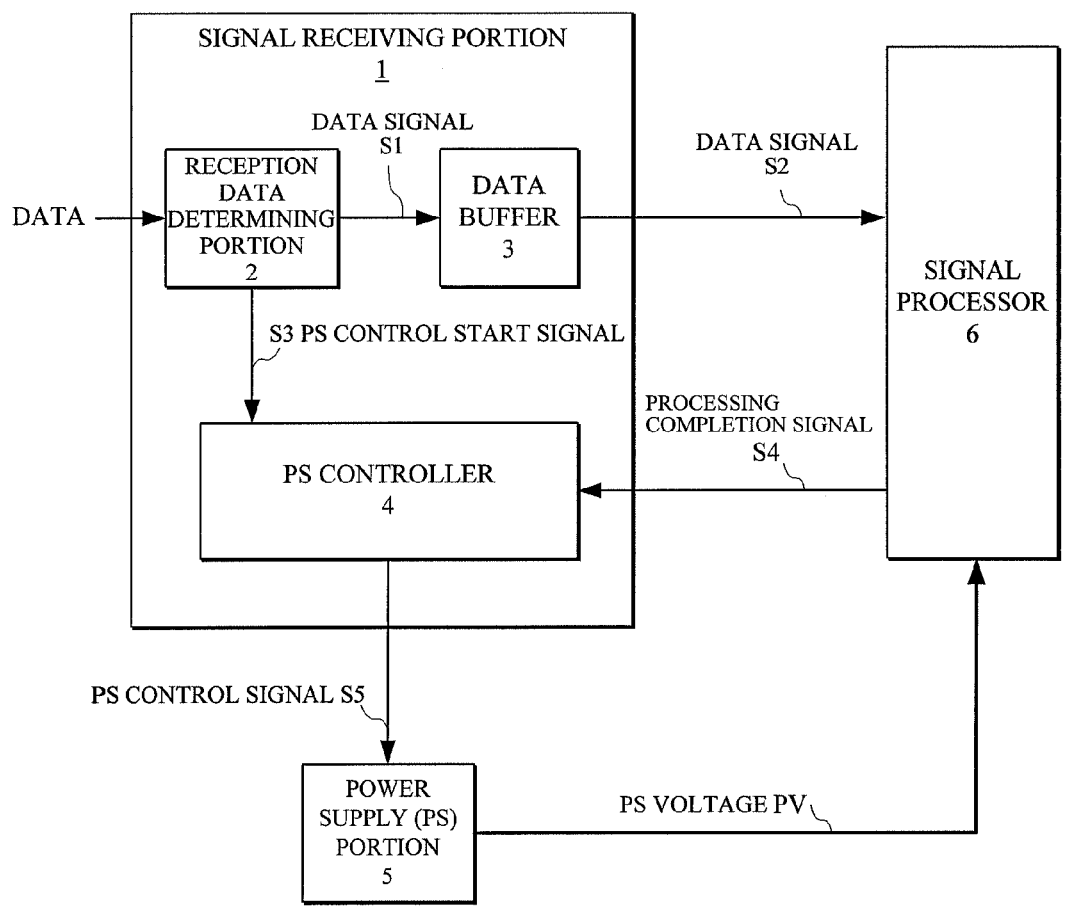
FIG. 1 is a block diagram depicting a basic arrangement of a power supply control method and device.

Conceptual Description: FIG. 1

FIG. 1 depicts a basic arrangement of a signal receiving portion 1 realizing a power supply control method and device according to the present invention, in which the signal receiving portion 1 is composed of a reception data determining portion 2, a data buffer 3 and a power supply (PS) controller 4, the signal receiving portion 1 being connected to a power supply portion (unit) 5 and a signal processor 6 supplied with power from the power supply portion 5 to perform the circuit operation.

The reception data determining portion 2 within the signal receiving portion 1 determines whether the data received are valid or invalid, in which only a data signal Si determined as valid data is outputted to a data buffer 3 while outputting a PS (power supply) control start signal S3 to a PS controller 4. In response to the PS control start signal S3, the PS controller 4 outputs a PS control signal S5 to the power supply portion 5 at a timing before the data signal S2 is outputted from the data buffer 3.

The PS control signal S5 is a signal for suppressing a variation of a power supply voltage PV supplied from the power supply portion 5 for the signal processor 6 to perform the signal processing such as serving to increase the switching frequency or output voltage of the power supply portion 5. The signal processor 6 generates a processing completion signal S4 at the time of process completion to be provided to the PS controller 4. This PS controller 4 provides the PS control signal S5 to the power supply portion 5 to restore the control state (switching frequency or output voltage) to the original state.

Thus, the data signal S2 is sent to the signal processor 6 to predict in advance a reduction of the PS voltage PV of the power supply portion 5 due to an increase of the consumption power in the signal processor 6, thereby enabling the power supply portion 5 to provide a power supply without decreasing the PS voltage PV of the power supply portion 5.

Figure 2:
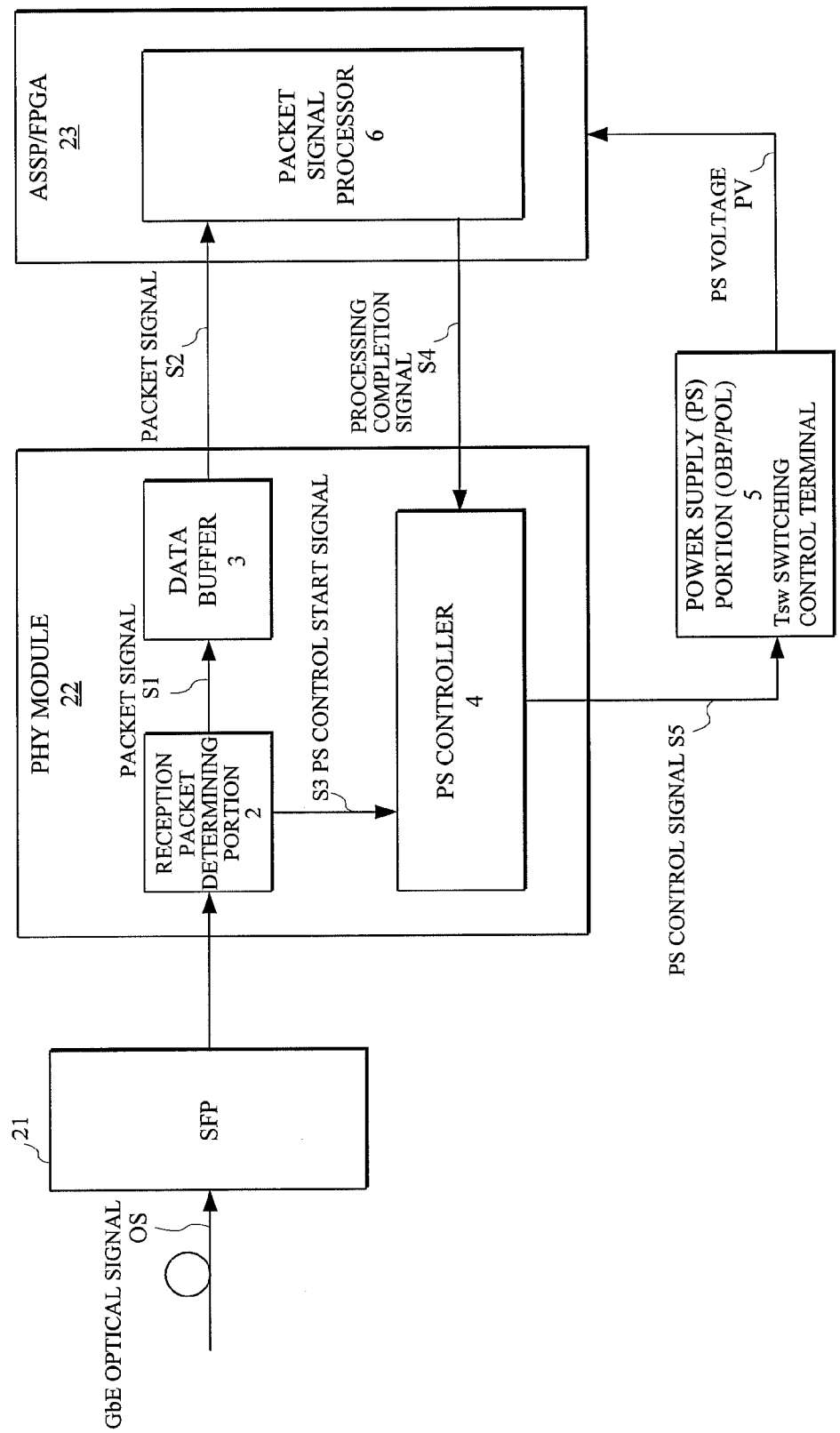
FIG. 2 is a block diagram depicting an embodiment [1] of a power supply control method and device.
Figure 3:
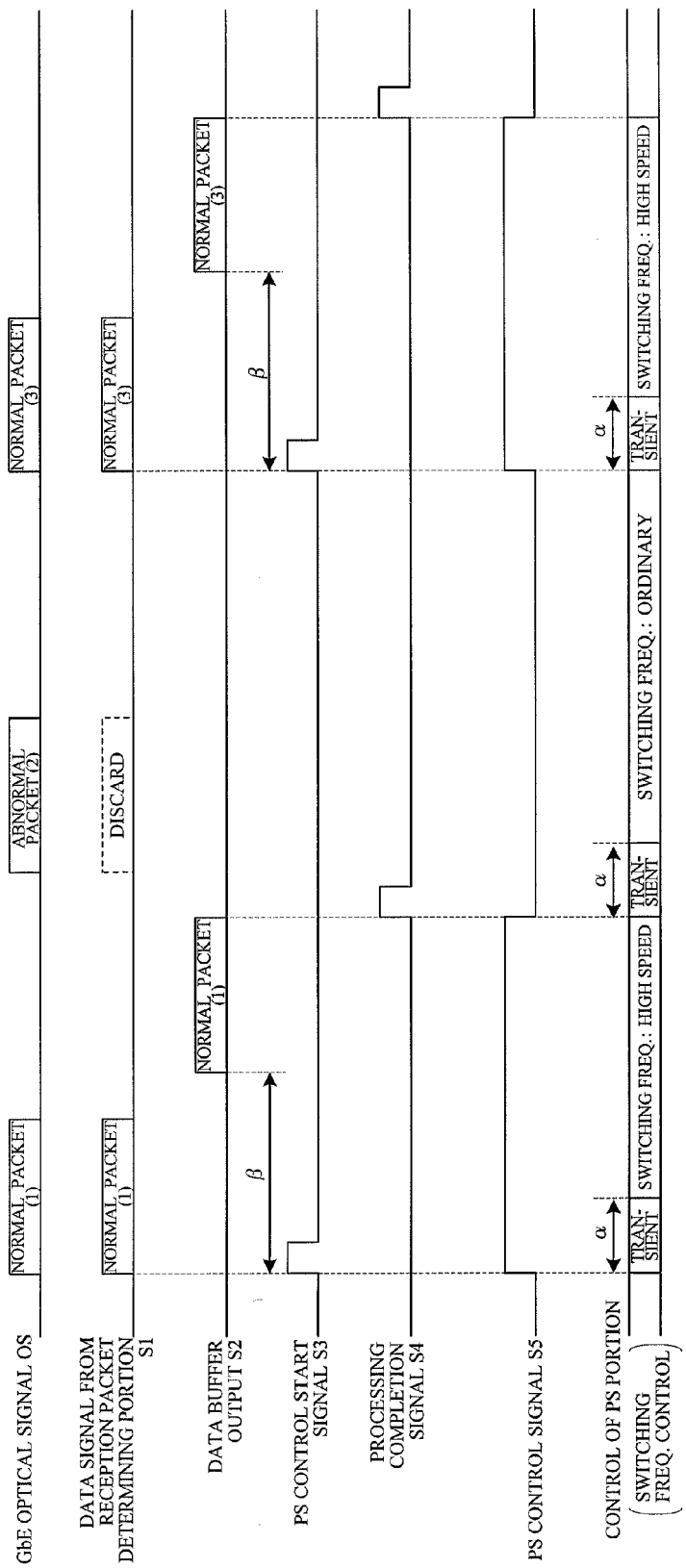
FIG. 3 is a time chart depicting an operation of the embodiment [1]

*Embodiment [1]: FIGS. 1-3

Figure 13A:
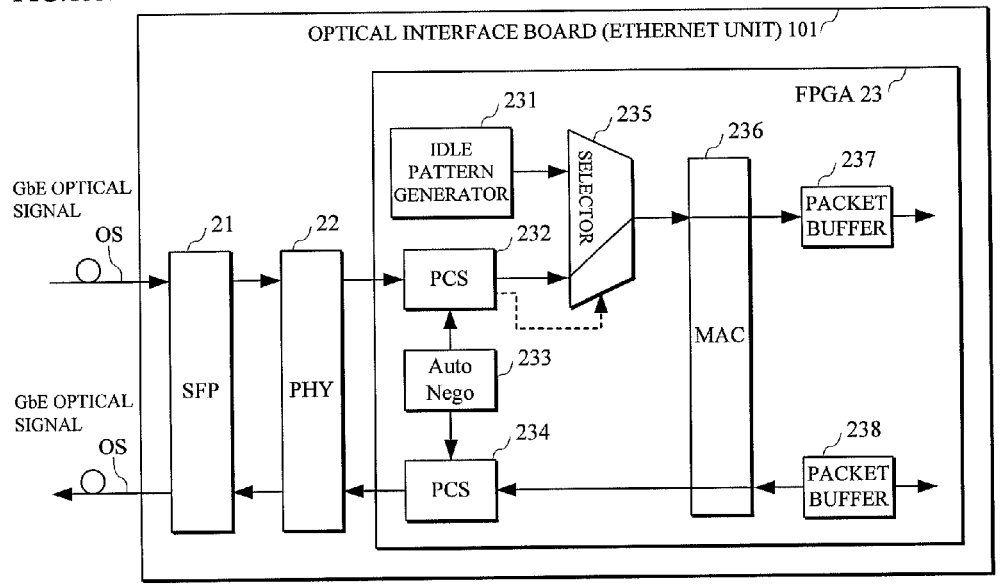
FIGS. 13A and 13B are block diagrams depicting a general arrangement of an optical interface board depicted in FIG. 12.
Figure 13B:
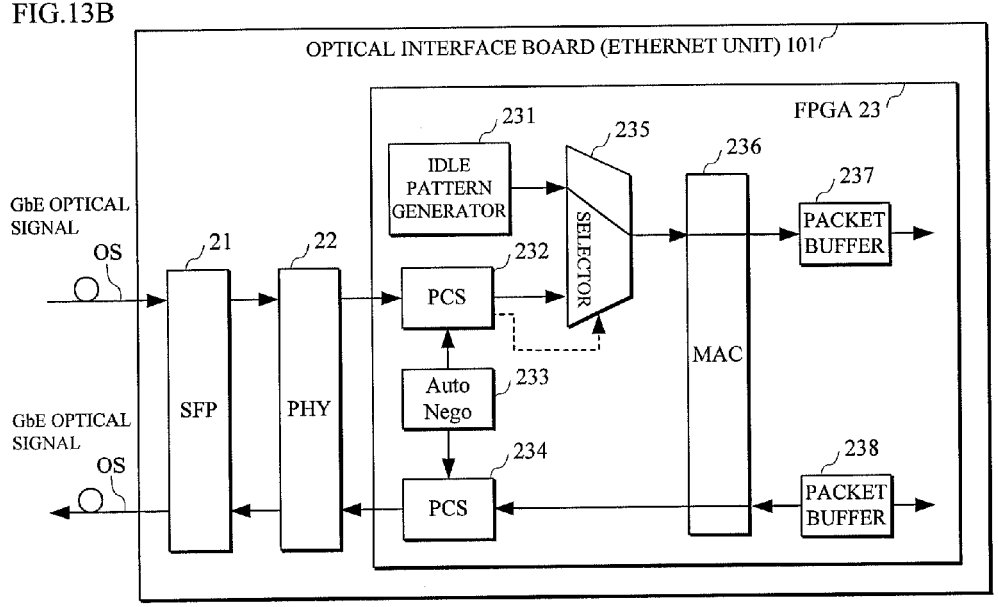

FIG. 2 depicts an embodiment [1] of a power supply control method and device according to the present invention. This embodiment is applied to the optical interface board (Ethernet unit) 101 depicted in FIG. 13, in which particularly the PHY processing module 22 is applied as the signal receiving portion 1 depicted in FIG. 1 and the packet signal processor 6 provided within an ASSP/FPGA 23 is applied as the signal processor 6 in FIG. 1. The packet signal processor 6 is supplied with power from the power supply portion (OBP/POL: On Board Power unit/Point Of Load) 5 in the ASSP/FPGA 23 for performing the circuit operation. The power supply portion 5 is for example a DC-DC converter of a switching frequency controlled type. It is to be noted that a SONET signal etc. may be substituted for a packet signal.

An operation of the above noted embodiment [1] will now be described referring to a time chart depicted in FIG. 3.

When a packet (1) received as the GbE optical signal OS is determined to be a normal packet at the reception packet determining portion 2, the normal packet (1) is provided to the data buffer 3 as the data signal S1 from the reception packet determining portion 2 while at the same time the PS control start signal S3 pulsed is provided to the PS controller 4. The data buffer 3 provides the data signal S2 of the normal packet (1) to the packet signal processor 6 at the time when a specified time 3 as depicted has lapsed.

Having received the PS control start signal S3, the PS controller 4 starts up the PS control signal S5 to be provided to a switching control terminal Tsw of the power supply portion 5 to "H" level. At this time, the PS control signal S5 is kept at "H" level. The power supply portion 5 having received the PS control signal S5 at "H" level increases the internal switching frequency, for example a switching frequency of a DC-DC converter, upon outputting the PS voltage PV (direct current).

It takes a fixed transient time α until the switching frequency of the power supply portion 5 actually supplied after the increase of the switching frequency increases. The relationship between the transient time α and the time β of the normal packet (1) from the time it is inputted to the data buffer 3 to the time it is outputted from the data buffer 3 is set as β>α.

Therefore, the switching frequency of the power supply portion 5 being supplied to the packet signal processor 6 will be of a high rate by the time the normal packet (1) is inputted to the packet signal processor 6, so that even though a rapid high consumption current is caused by the normal packet (1) at the packet signal processor 6, a voltage drop such as obstructing the normal operation of the packet signal processor 6 does not arise in the PS voltage PV.

Upon the completion of the packet signal processing at the packet signal processor 6, the pulsed processing completion signal S4 is outputted from the packet signal processor 6 to the PS controller 4. Having received the processing completion signal S4, the PS controller 4 lowers the PS control signal S5 to "L" level. The power supply portion 5 having received the PS control signal S5 changed to "L" level at the switching control terminal Tsw restores the switching frequency of the DC-DC converter at the time of outputting the PS voltage PV to the normal setting value. From this point, after a lapse of a fixed transient time α, the switching frequency is returned to the normal value.

On the other hand, when a packet (2) is received as the GbE optical signal OS, it will be determined as an abnormal packet at the reception packet determining portion 2, discarded and not inputted to the data buffer 3. Then, upon the reception of the normal packet (3) again, the same processing as the normal packet (1) will be executed.

An effect example in a case where the switching frequency is increased is depicted in FIGS. 4A-4D.

Figure 4C:
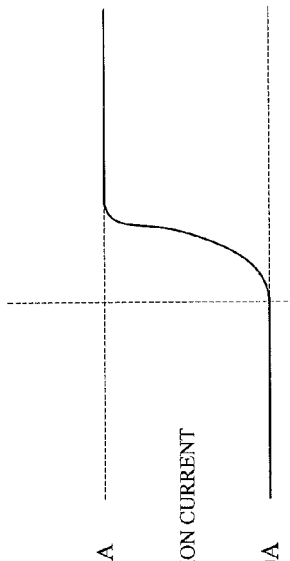
FIGS. 4A-4D are waveform diagrams for illustrating an effect of the embodiment [1]
Figure 4D:
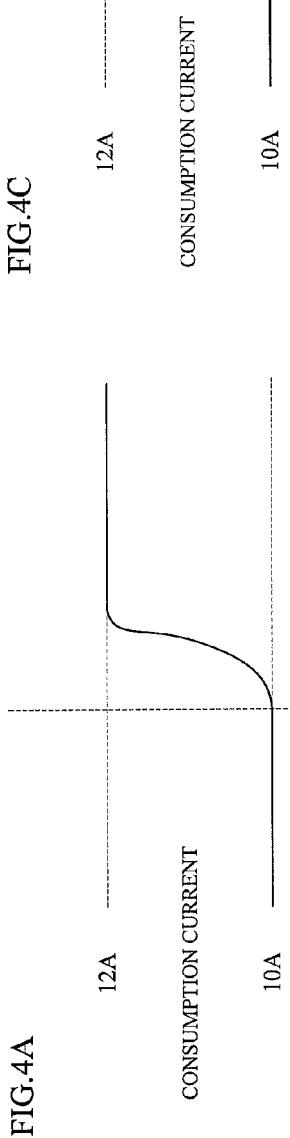
Figure 4A:
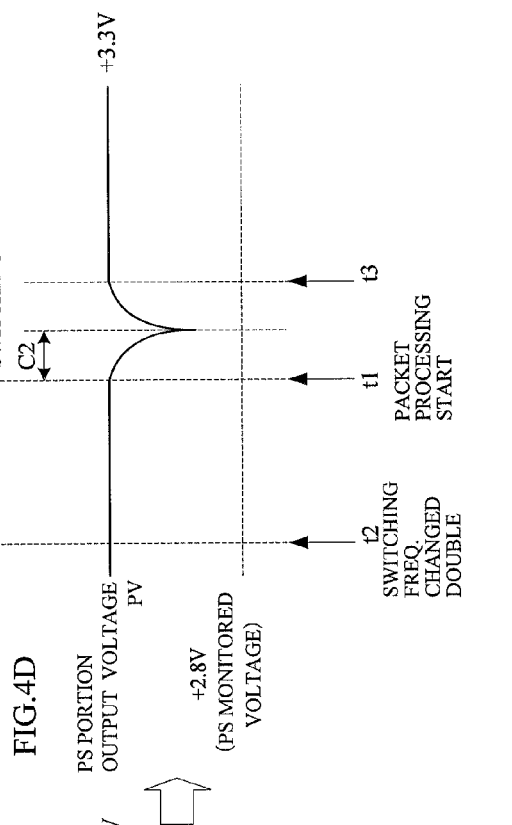
Figure 4B:
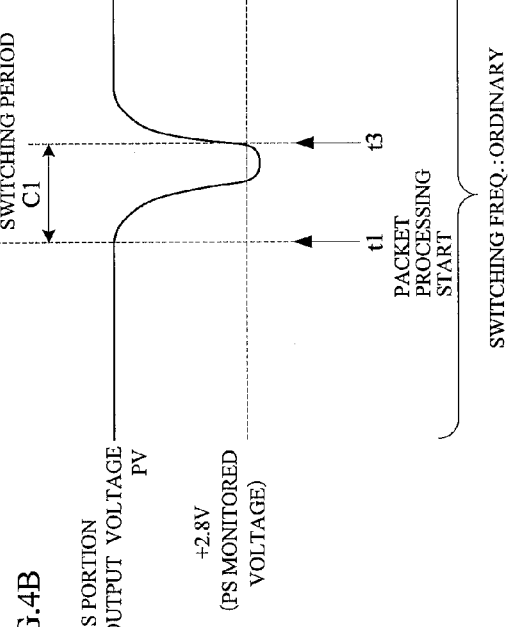

In a normal state of the switching frequency of the power supply portion 5, when the packet processing is started (time point t1), the consumption current rapidly rises up from 10A to 12A as depicted in FIG. 4A. As the consumption current thus rapidly changes, the response of the power supply portion 5 can not follow the change, so that the PS voltage PV falls. In this case, as depicted in FIG. 4B, the voltage which was +3.3V falls below +2.8V (time point t3) that is a threshold value of the PS monitoring voltage, assuming a voltage abnormality (alarm generation).

On the other hand, as depicted in FIG. 4C, when the packet processing is started (time point t1) after the switching frequency is changed double at the time point t2, even though the consumption current which was 10A rapidly increases to 12A, the switching frequency of the power supply portion 5 is already doubled, so that as seen from FIG. 4D the response of the power supply portion 5 can follow such a rapid change of the consumption current, in which the output voltage of the power supply portion 5 does not fall below +2.8V that is the threshold value of the power supply monitoring voage without assuming an abnormal voltage and therefore can recover at the time point t3.

Figure 5:
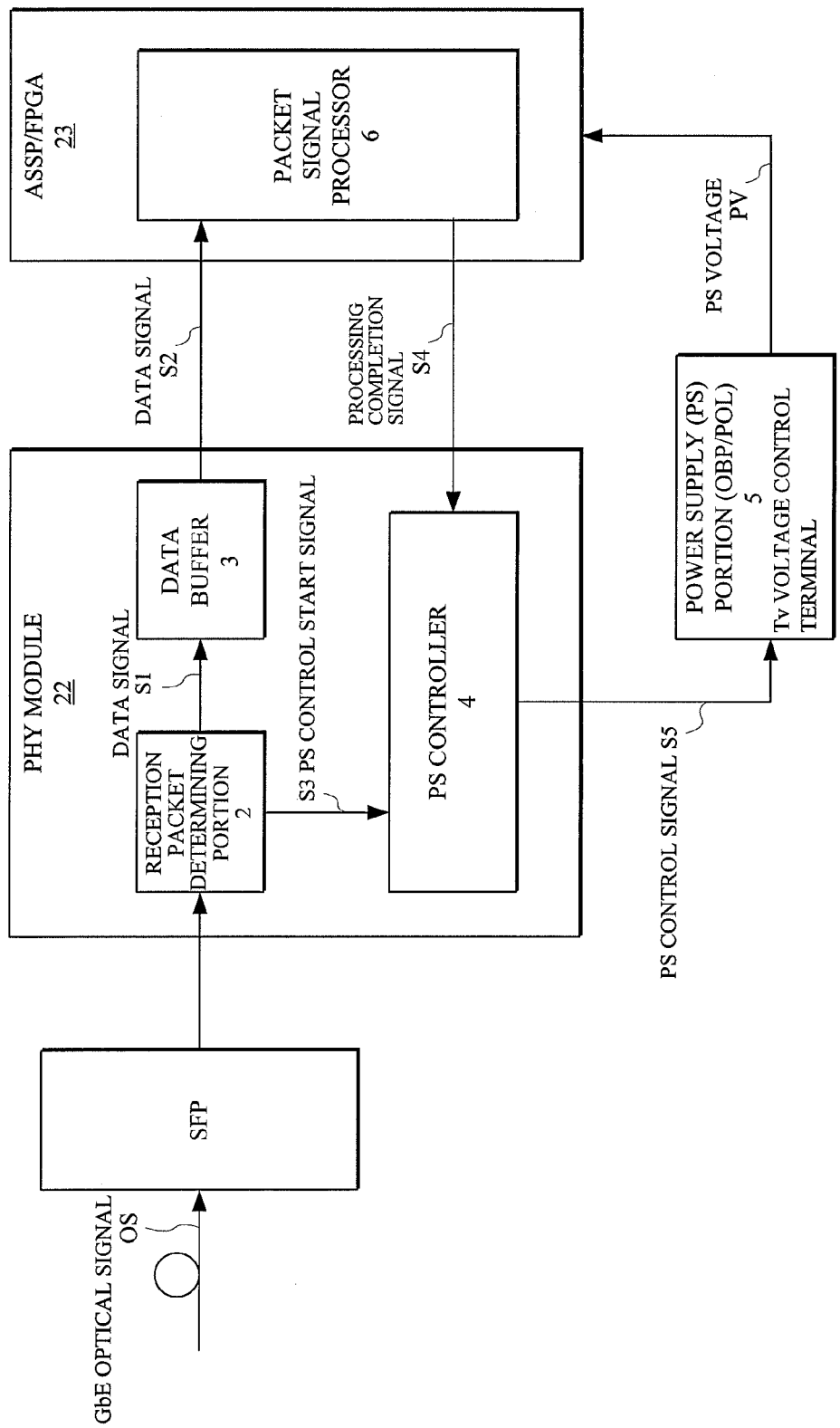
FIG. 5 is a block diagram depicting an embodiment [2] of a power supply control method and device.
Figure 6:
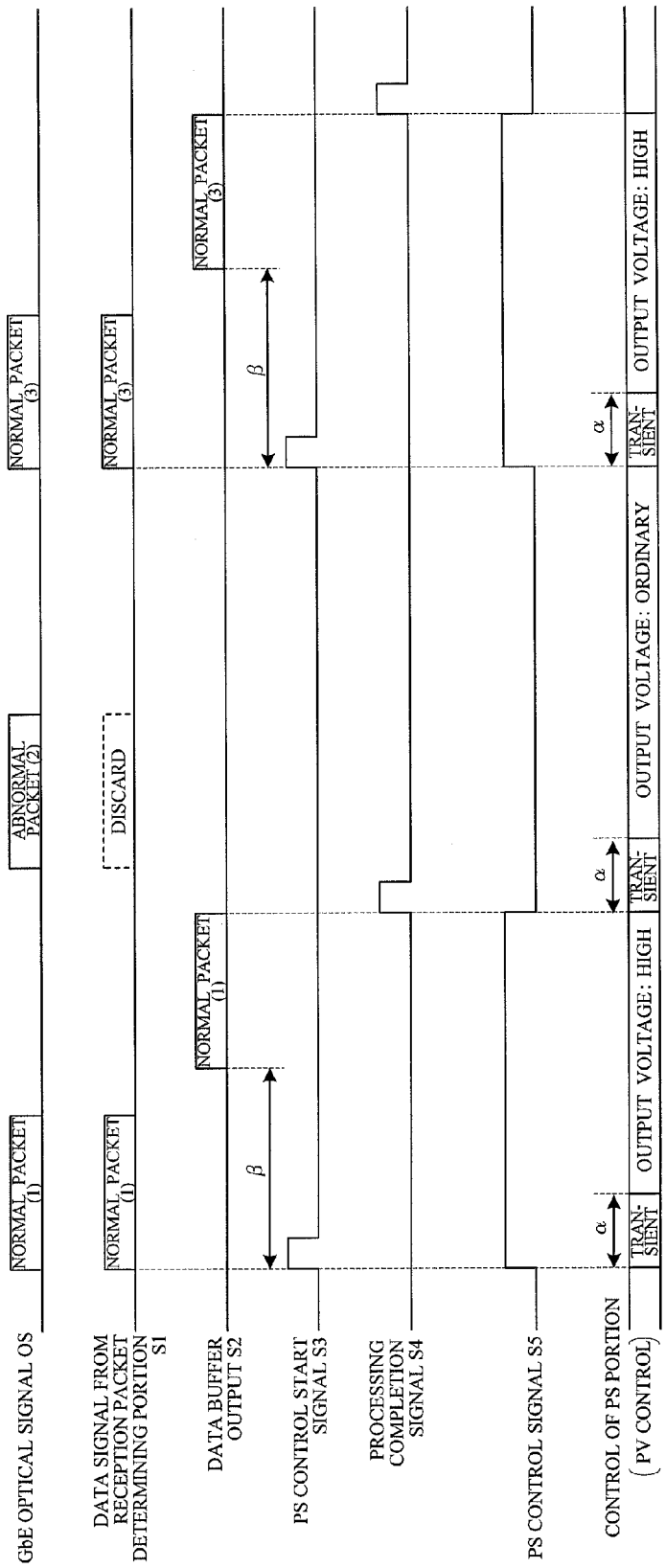
FIG. 6 is a time chart depicting an operation of the embodiment [2]

*Embodiment [2]: FIGS. 5-7

FIG. 5 depicts an embodiment [2] of the present invention. The difference between the embodiments [2] and [1] is that while the embodiment [1] controls the switching frequency of the power supply portion 5, this embodiment [2] controls the voltage of the power supply portion 5 by receiving the PS control signal S5 at a voltage control terminal Tv.

An operation time chart of this embodiment [2] is depicted in FIG. 6.

It is also seen from this time chart that the difference between the embodiments [2] and [1] is that the control of the power supply portion 5 is not made by the switching frequency but by the output voltage.

FIGS. 7A-7D depict an effect example in a case where the PS voltage PV of the power supply portion 5 is raised.

After the packet processing is started (time point t1) during the PS voltage PV being normal, when the consumption current which was 10A rapidly rises up to 12A as depicted in FIG. 7A, the response of the power supply portion 5 can not follow, causing a reduction of the PS voltage PV. In this case, as depicted in FIG. 7B, the output voltage PV which was +3.3V falls below +2.8V that is the threshold value of the PS monitoring voltage, assuming an abnormal voltage.

On the other hand, even though the consumption current which was 10A rapidly rises up to 12A as depicted in FIG. 7C, the PS voltage of the power supply portion 5 in this embodiment is increased as seen from FIG. 7D, not falling below +2.8V that is the threshold value of the PS monitoring voltage even in such a rapid change of the consumption current and not assuming an abnormal voltage.

Figure 8:
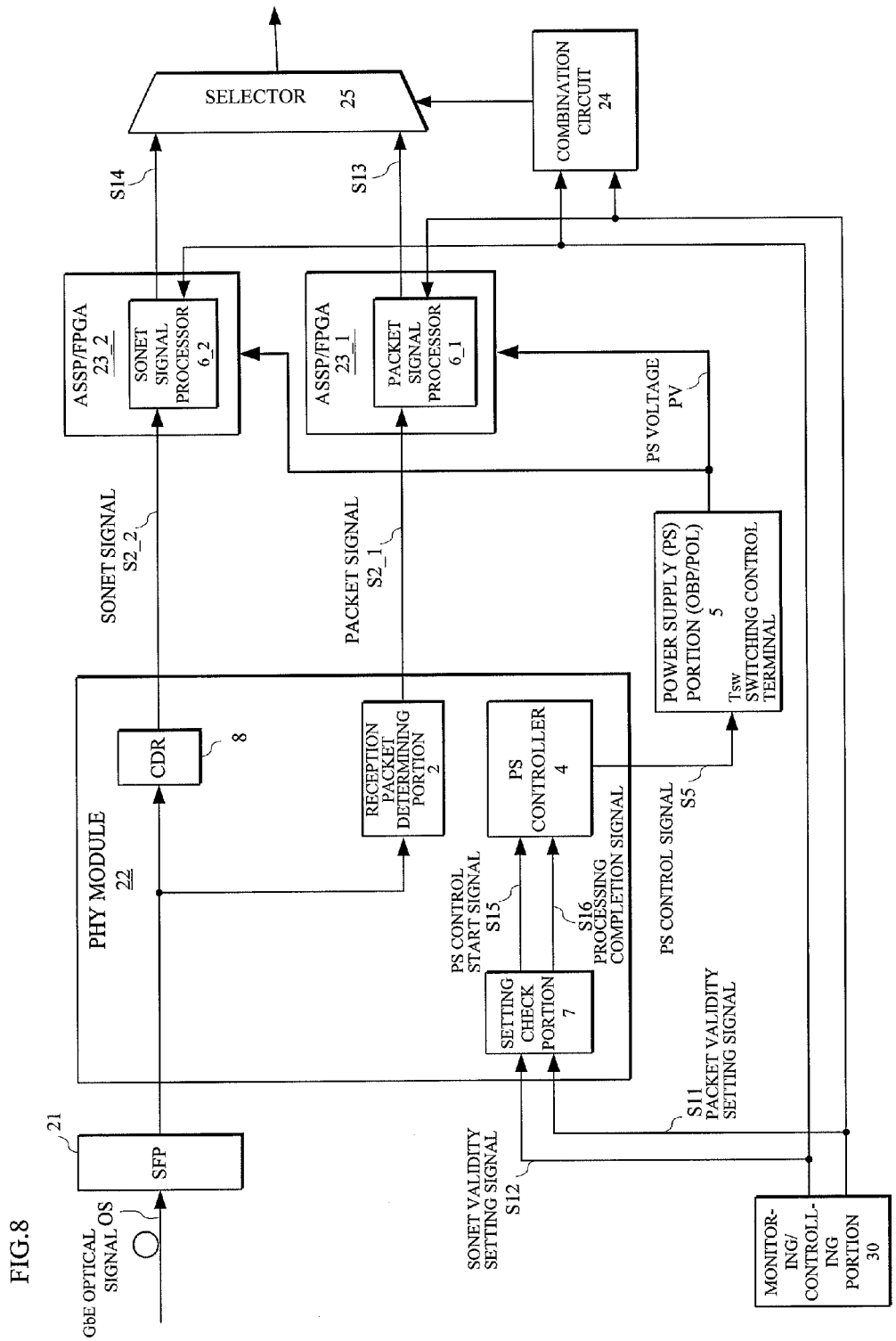
FIG. 8 is a block diagram depicting an embodiment [3] of a power supply control method and device.
Figure 9:
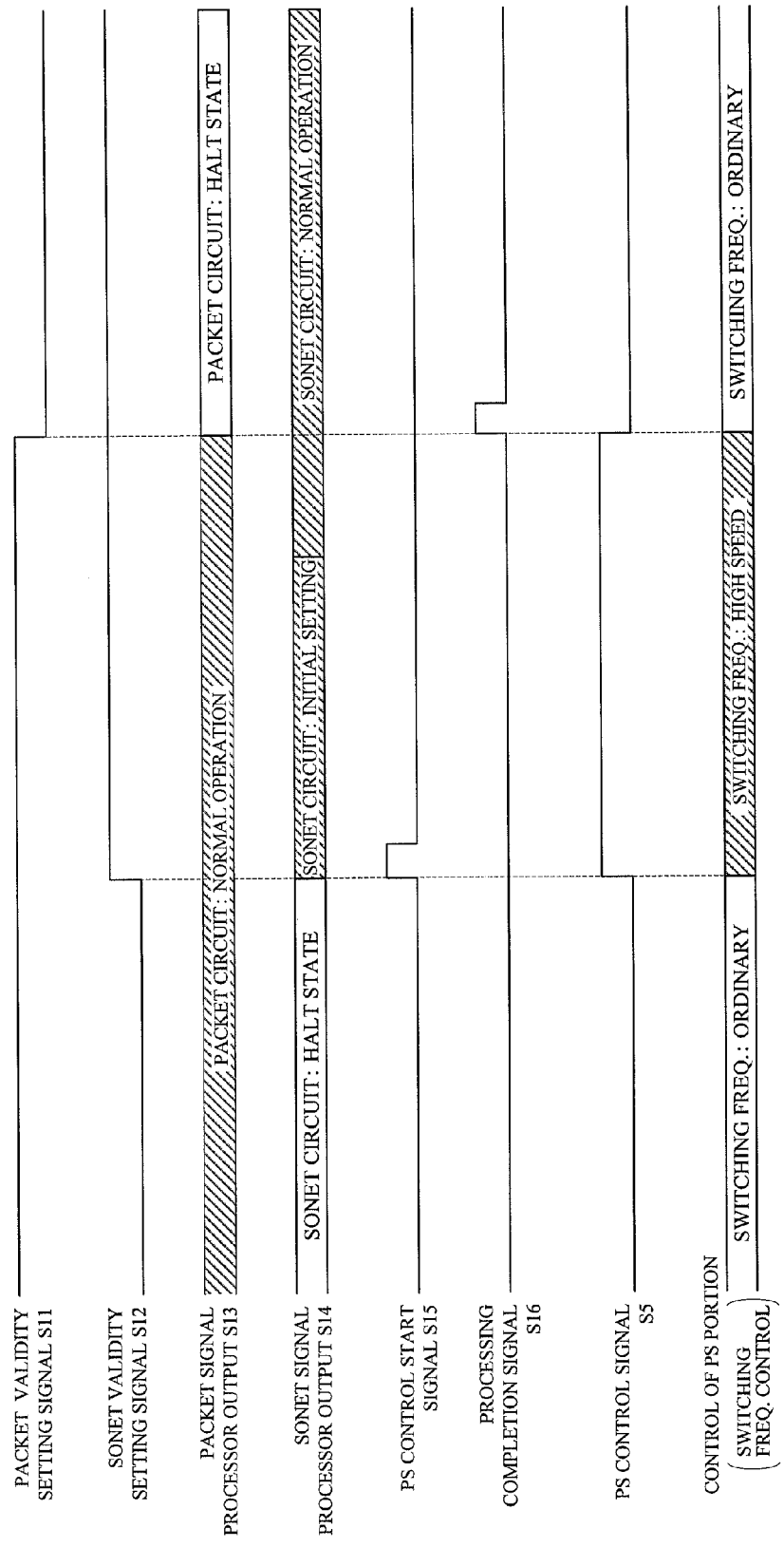
FIG. 9 is a time chart depicting an operation of the embodiment [3]

*Embodiment [3]: FIGS. 8 and 9

FIG. 8 depicts an embodiment [3] of the present invention. This embodiment [3] selectively uses a SONET signal (frame) or a packet (IP packet) as a data signal, so that in the embodiment [1] depicted in FIG. 2 a packet signal processor 6_1 and a SONET signal processor 6_2 are respectively provided in ASSP/FPGAs 23_1 and 23_2 as a signal processor and commonly connected to the power supply portion 5. Furthermore, a monitoring/controlling portion 30 is provided, and in the PHY processing module 22 a setting check portion 7 is provided between the monitoring/controlling portion 30 and the PS controller 4. It is to be noted that a CDR (Clock Data Recovery) 8 is provided to generate a SONET signal S2_2 reproduced from clocks of the reception signal while as regards the packet signal only the reception packet determining portion 2 is provided without using the data buffer 3 used in the embodiment [1].

Namely, the monitoring/controlling portion 30 outputs a packet validity setting signal S11 to the packet signal processor 6_1 and the setting check portion 7, in which the packet signal processor 6_1 responsively operates and halts the circuit operation with the packet validity setting signal S11. Similarly, the monitoring/controlling portion 30 outputs a validity setting signal S12 to the SONET signal processor 6_2 and the setting check portion 7, in which the SONET signal processor 6_2 responsively operates and halts the circuit operation with the SONET validity setting signal S11.

The monitoring/controlling portion 30 is also connected to a combination circuit 24, which is connected to select one of the outputs of the signal processors 6_1 and 6_2 through the sector 25.

The setting check portion 7 having received the SONET validity setting signal S12 and the packet validity setting signal S11 outputs a PS control start signal S15 and a processing completion signal S16 to the PS controller 4. Based on these signals, the PS controller 4 outputs the PS control signal S5 to the switching control terminal Tsw of the power supply portion 5. The power supply portion 5 controls the switching frequency of the internal DC-DC converter for generating the PS voltage PV, whereby both of the settings of the SONET validity setting signal S12 and the packet validity setting signal S11 are validated, so that even in a case where both of the SONET signal processor 6_2 and the packet signal processor 6_1 are made active, the setting of the switching frequency to a high rate enables the power supply to be made without decreasing the PS voltage PV.

The output signals of the signal processors 6_1 and 6_2 are provided to the selector 25 controlled according to the algorithm of the combination circuit 24 having received the validity setting signals S11 and S12, whereby one of the output signals of the signal processors 6_1 and 6_2 is to be selected.

FIG. 9 depicts an operation time chart of the embodiment [3], in which the operation of the embodiment [3] in FIG. 8 will be hereinafter described referring to the time chart.

Under a state where the packet validity setting signal S11 from the monitoring/controlling portion 30 is at "H" level enabling the packet signal processor 6_1 to be normally operated, when the SONET signal processor 6_2 is halted by the SONET validity setting signal S12, indicating the PS control signal S5="L" level, the switching frequency of the power supply portion 5 is in the normal state, where even if the relationship between the validity setting signals S11 and S12 is reversed, the following description can be similarly applied.

Then, in order to operate the SONET signal processor 6_2 switched for the SONET signal processing it is required to make an initial setting for the SONET signal processor 6_2, where during the initial setting an overlapped validity state (preparation state) of the packet validity setting signal S11="H" level and the SONET validity setting signal S12="H" level is required.

In the case of the packet validity setting signal S11="H" level and the SONET validity setting signal S12="H" level, the pulsed PS control start signal S15 from the setting check portion 7 is outputted. In response to the signal S15, the PS controller 4 raises the PS control signal S5 to be provided to the switching control terminal Tsw of the power supply portion 5 to "H" level when the PS control start signal S15 assumes "H" level. When the PS control signal S5 assumes "H" level, the power supply portion 5 changes the switching frequency for providing the PS voltage PV as an output, to a high rate.

Then, the initial setting of the SONET signal processor 6_2 is completed thereby to put the SONET signal processor 6_2 in the normal operation state, where the packet signal processor 6_1 is also put in the normal operation state, so that both of the signal processors are put in the same operation state. Therefore, even though the consumption current is increased as the input signal is rapidly increased, the output voltage PV of the power supply portion 5 can follow the increase since the switching frequency of the power supply portion 5 is at a high rate, so that the PS voltage PV supplied by the power supply portion 5 does not cause a voltage drop such as obstructing the normal operation.

Since the SONET signal processor 6_2 is subsequently rendered in the normal operation state, the packet validity setting signal S11 from the monitoring/controlling portion 30 assumes "L" level (invalid), so that the packet signal processor 6_1 is put in the operation halt state and the pulsed processing completion signal S16 is outputted from the setting check portion 7. Having received the processing completion signal S16, the PS controller 4 outputs the PS control signal S5 to the switching control terminal Tsw of the power supply portion 5. The power supply portion 5 having received the PS control signal S5 restores the switching frequency for the PS voltage PV to the normal setting, that is the switching frequency of the power supply is returned to the normal state.

The combination circuit 24 controls the selector 25 so as to select the output signal S13 of the packet signal processor 6_1 in the case of the validity setting signal S11="H" and S12="L" and selects the output signal S14 of the SONET signal processor 6_2 in the case of the validity setting signal S11="L" and S12="H".

Figure 10:
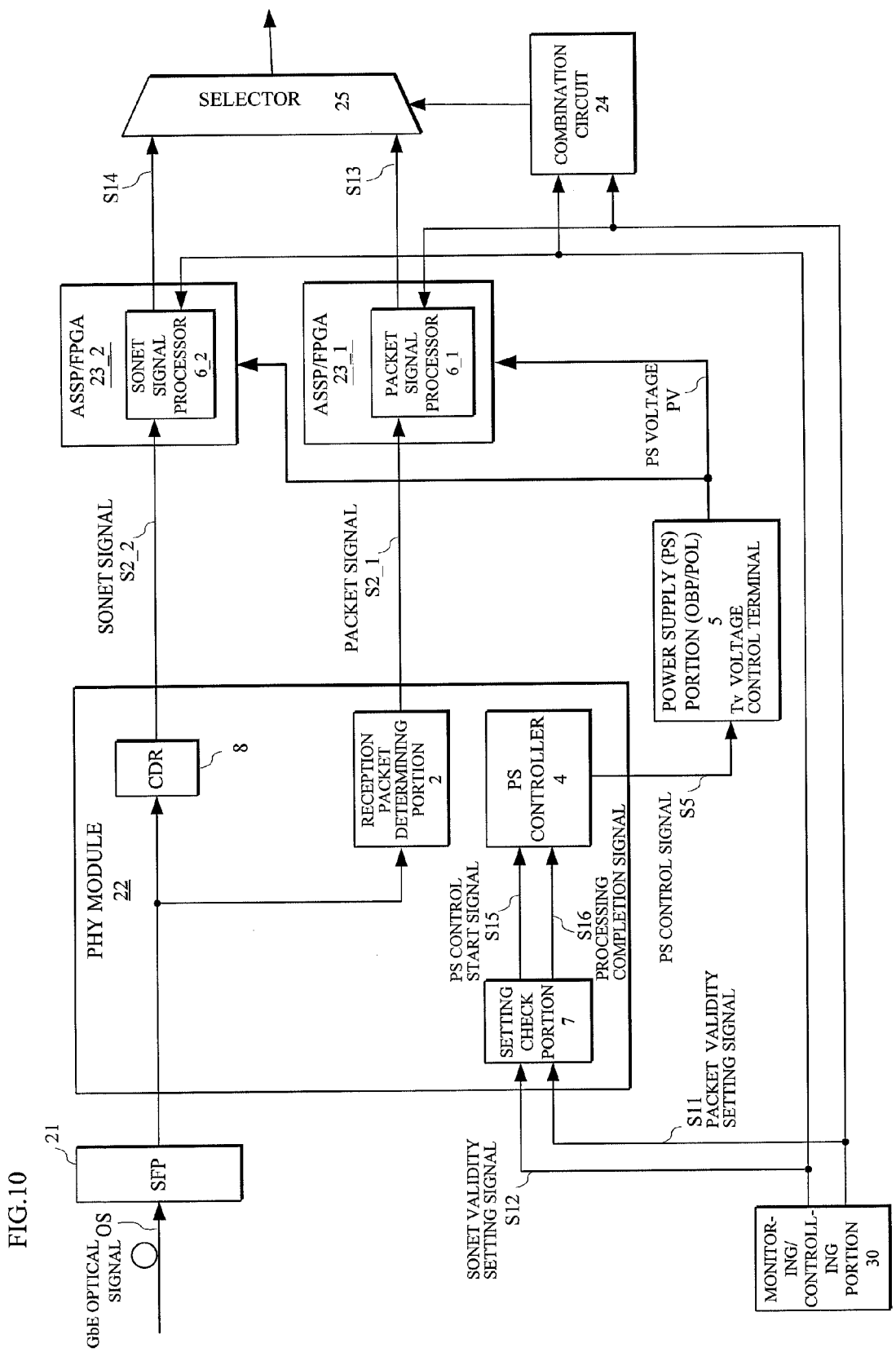
FIG. 10 is a block diagram depicting an embodiment [4] of a power supply control method and device.
Figure 11:
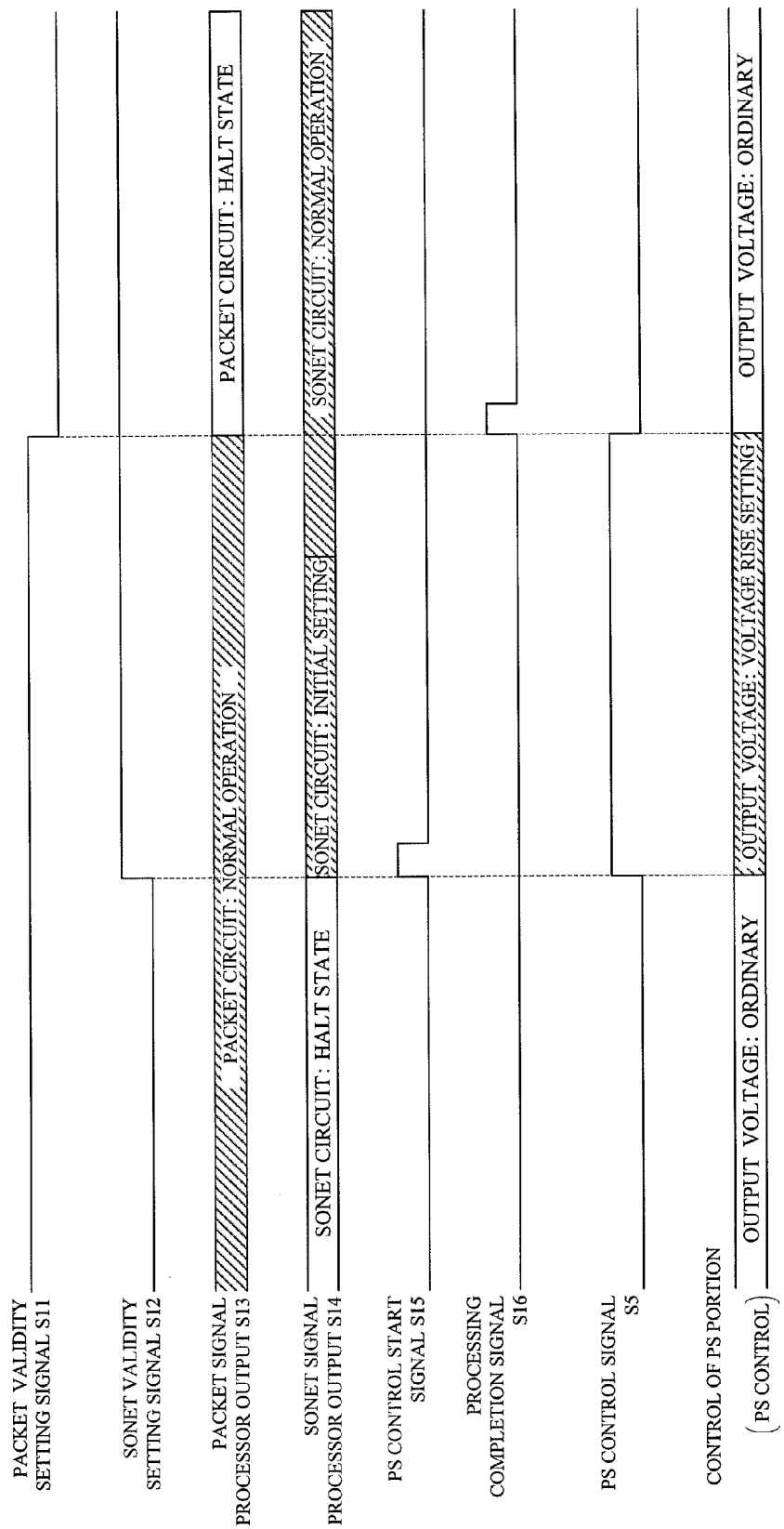
FIG. 11 is a time chart depicting an operation of the embodiment [4]
Figure 12:
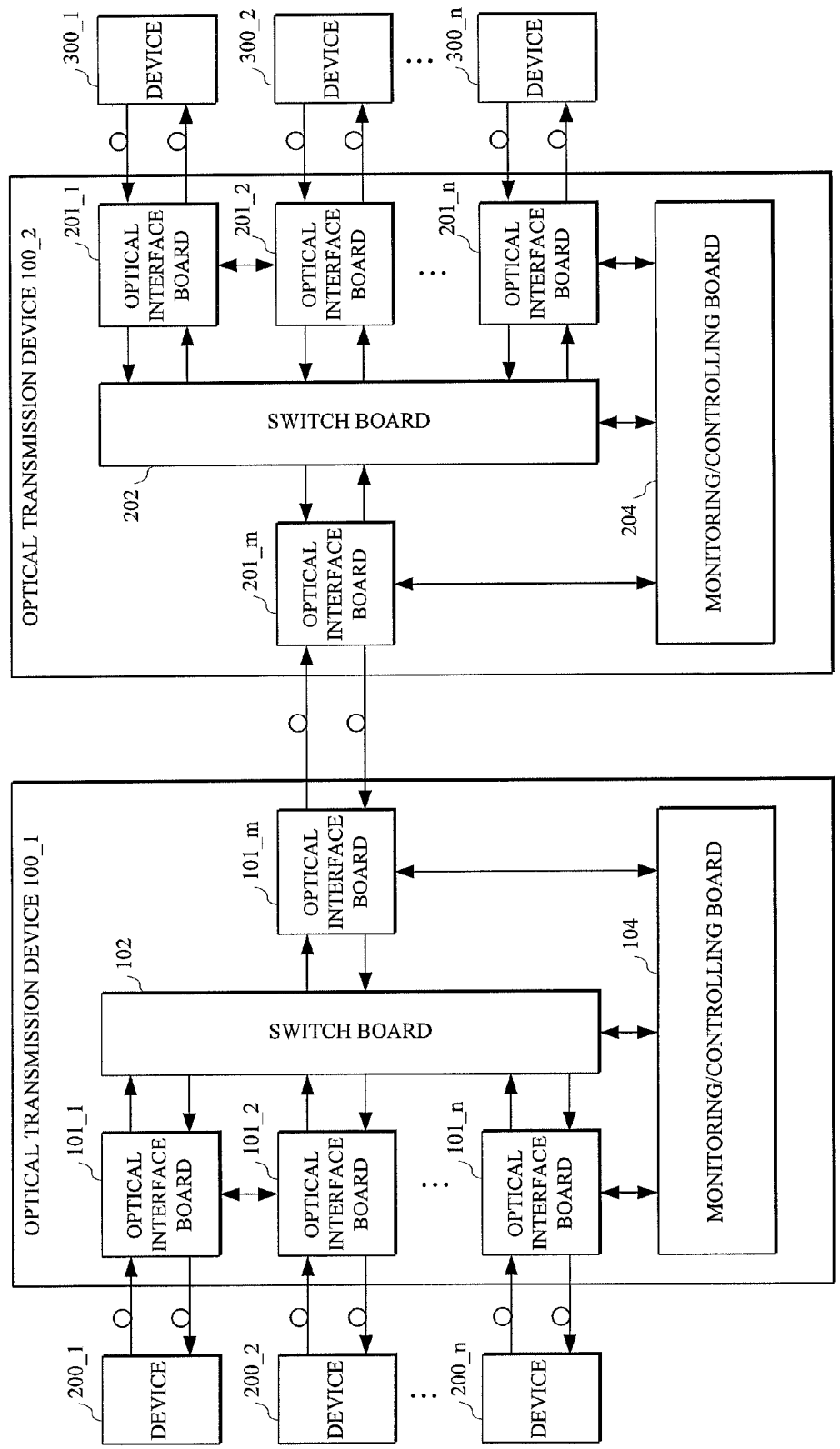
FIG. 12 is a block diagram depicting a general arrangement of an optical transmission device.

*Embodiment [4]: FIGS. 10 and 11

FIG. 10 depicts an embodiment [4] of the present invention, in which the relationship between the embodiments [4] and [3] is the same as the one between the above embodiments [1] and [2].

Namely, while in the embodiment [3] the switching frequency of the power supply portion 5 is controlled, in this embodiment [4] the voltage control for the power supply portion 5 is performed, in which the output voltage PV of the power supply portion 5 is set high, thereby preventing a voltage drop such as obstructing the normal operation.

An operation time chart of this embodiment [4] is depicted in FIG. 11, in which in the time chart of this embodiment [4] the voltage control for the power supply portion 5 is performed while in the time chart of the embodiment [3] the switching frequency control for the power supply portion 5 is performed.

While in the above embodiments two types of data signals such as a SONET signal and a packet signal are exemplified, using three data signals or more can be similarly applied if the two data signals among them have the above mentioned relationship. Also, while the two data signals from the initial state to the inputted state are not depicted, it is preferable in this case to utilize the data buffer by the application of the above noted embodiment [1].

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply control method comprising:
separating received data signals by type to be outputted to respective signal processors;
receiving validity setting signals by type and generating a power supply control start signal when the validity setting signals become valid in an overlapped manner; and
generating a power supply control signal for suppressing an output voltage variation of each power supply of the signal processors until one of the validity setting signals which have been valid so far becomes invalid after the power supply control start signal is generated.

2. The power supply control method as claimed in claim 1, wherein the validity setting signals halt operations of the signal processors made invalid.

3. The power supply control method as claimed in claim 1, wherein the output signals of the signal processors are selected based on a combination of the validity setting signals.

4. The power supply control method as claimed in claim 1, wherein the data signal comprises a SONET (Synchronous Optical NETwork) signal or a packet signal.

5. A power supply control device comprising:
a portion separating received data signals by type to be outputted to respective signal processors;
a portion receiving validity setting signals by type and generating a power supply control start signal when the validity setting signals become valid in an overlapped manner; and
a portion generating a power supply control signal for suppressing an output voltage variation of each power supply of the signal processors until one of the validity setting signals which have been valid so far becomes invalid after the power supply control start signal is generated.

6. The power supply control device as claimed in claim 5, wherein the validity setting signals halt operations of the signal processors made invalid.

7. The power supply control device as claimed in claim 5, wherein the output signals of the signal processors are selected based on a combination of the validity setting signals.

8. The power supply control device as claimed in claim 5, wherein the data signal comprises a SONET (Synchronous Optical NETwork) signal or a packet signal.

9. The power supply control method as claimed in claim 1, wherein the power supply control signal comprises a signal for increasing a switching frequency of the power supply.

10. The power supply control method as claimed in claim 1, wherein the power supply control signal comprises a signal for increasing an output voltage of the power supply.

11. The power supply control device as claimed in claim 5, wherein the power supply control signal comprises a signal for increasing a switching frequency of the power supply.

12. The power supply control device as claimed in claim 5, wherein the power supply control signal comprises a signal for increasing an output voltage of the power supply.

* * * * *